United States Patent [19]
King

[11] Patent Number: 5,694,972
[45] Date of Patent: Dec. 9, 1997

[54] SADDLE TEE FOR IRRIGATION LINES

[75] Inventor: Thomas A. King, Ballwin, Mo.

[73] Assignee: Tom King Harmony Products, Inc., Ballwin, Mo.

[21] Appl. No.: 671,513

[22] Filed: Jun. 27, 1996

[51] Int. Cl.⁶ .................................. F16K 43/00
[52] U.S. Cl. .................. 137/318; 285/5; 285/14; 285/177; 285/197; 285/423; 285/906; 138/32
[58] Field of Search .................... 285/197, 906, 285/373, 319, 177, 5, 14, 423; 137/318; 138/32

[56] References Cited

U.S. PATENT DOCUMENTS

| | | |
|---|---|---|
| 2,344,163 | 3/1944 | Misch . |
| 3,240,434 | 3/1966 | Bradley ............................ 239/271 |
| 3,349,792 | 10/1967 | Larkin ............................. 137/318 |
| 3,448,758 | 6/1969 | Mullins ............................ 137/318 |
| 3,756,261 | 9/1973 | Minchhoff ........................ 137/318 |
| 3,806,031 | 4/1974 | Olson .............................. 239/207 |
| 3,834,628 | 9/1974 | Selman ............................ 239/542 |
| 3,920,037 | 11/1975 | Hoff et al. ....................... 137/318 |
| 3,973,732 | 8/1976 | Diggs .............................. 239/271 |
| 3,978,881 | 9/1976 | Mouranie ......................... 137/318 |
| 4,063,844 | 12/1977 | Pessia ............................. 408/204 |
| 4,112,944 | 9/1978 | Williams .......................... 137/318 |
| 4,121,771 | 10/1978 | Hendrickson ..................... 239/272 |
| 4,294,470 | 10/1981 | Tucker ........................... 285/197 X |
| 4,522,339 | 6/1985 | Costa .............................. 239/272 |
| 5,054,820 | 10/1991 | Lesquir et al. ................... 285/197 |
| 5,095,564 | 3/1992 | Kruger ............................ 285/197 |
| 5,105,844 | 4/1992 | King, Sr. ......................... 137/318 |
| 5,123,627 | 6/1992 | Hodges ............................ 285/197 |
| 5,169,177 | 12/1992 | McLennan ....................... 285/197 X |
| 5,322,083 | 6/1994 | Olivier ............................ 137/318 |

FOREIGN PATENT DOCUMENTS

| | | | |
|---|---|---|---|
| 625461 | 8/1961 | Canada ............................. | 285/197 |
| 1559036 | 3/1969 | France ............................. | 285/197 |

Primary Examiner—Dave W. Arola
Attorney, Agent, or Firm—Grace J. Fishel

[57] ABSTRACT

A one-piece saddle tee for installation on a fluid line such as an irrigation line. The saddle tee has a clamp includes a pair of opposing clamp segments having upper, lower and intermediate portions with at least one of the segments being hinged along its intermediate portion to one end of the base. The other of the segments is attached to the other end of the base. Each of the segments has a locking part at its lower end portion cooperating with a locking part of the other of the segments, the locking parts interconnecting the clamp segments when the clamp is pressed onto the line. A coupling tap may be used for punching a hole in the line. Coupling tap is secured to the line with saddle tee.

14 Claims, 3 Drawing Sheets

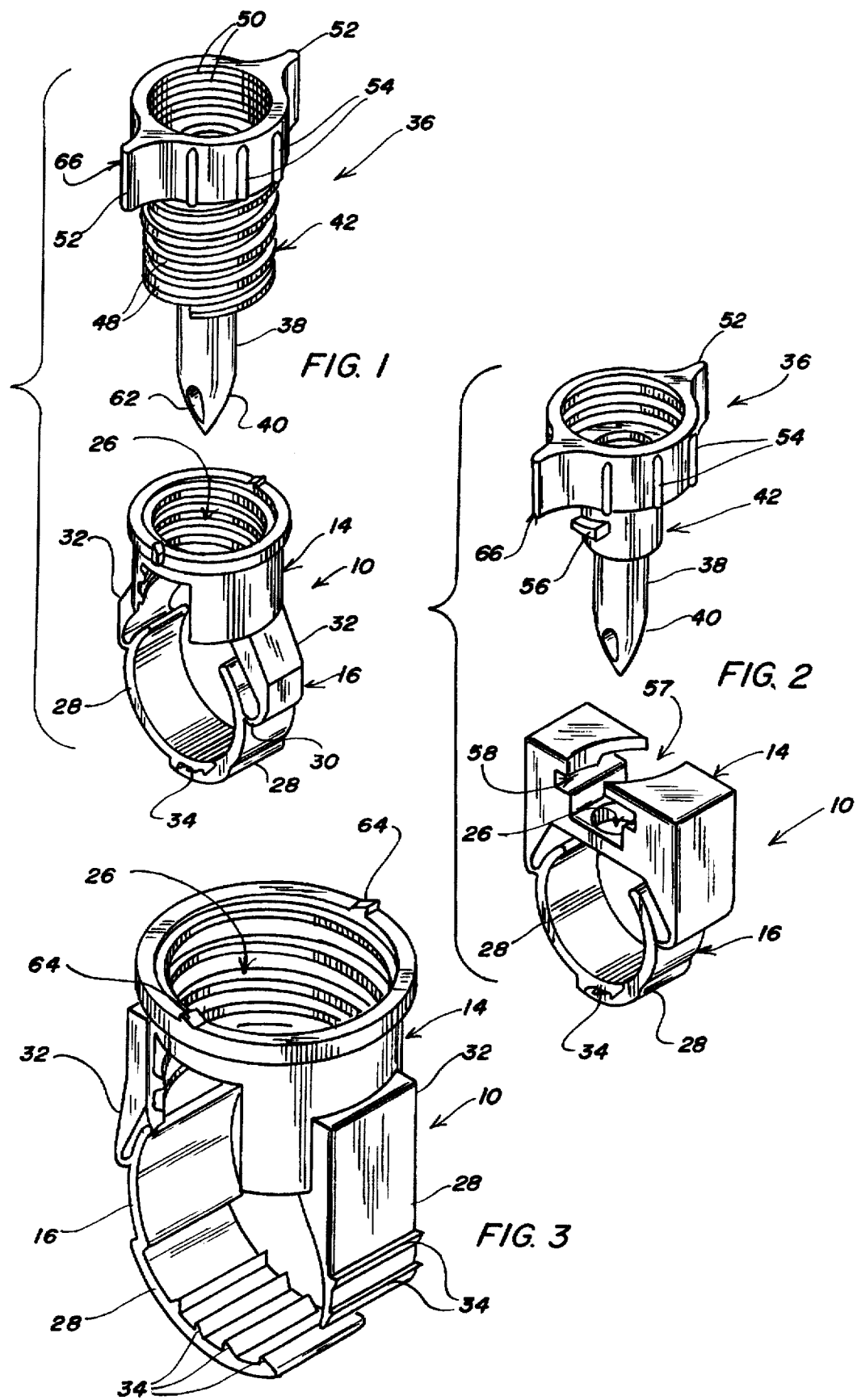

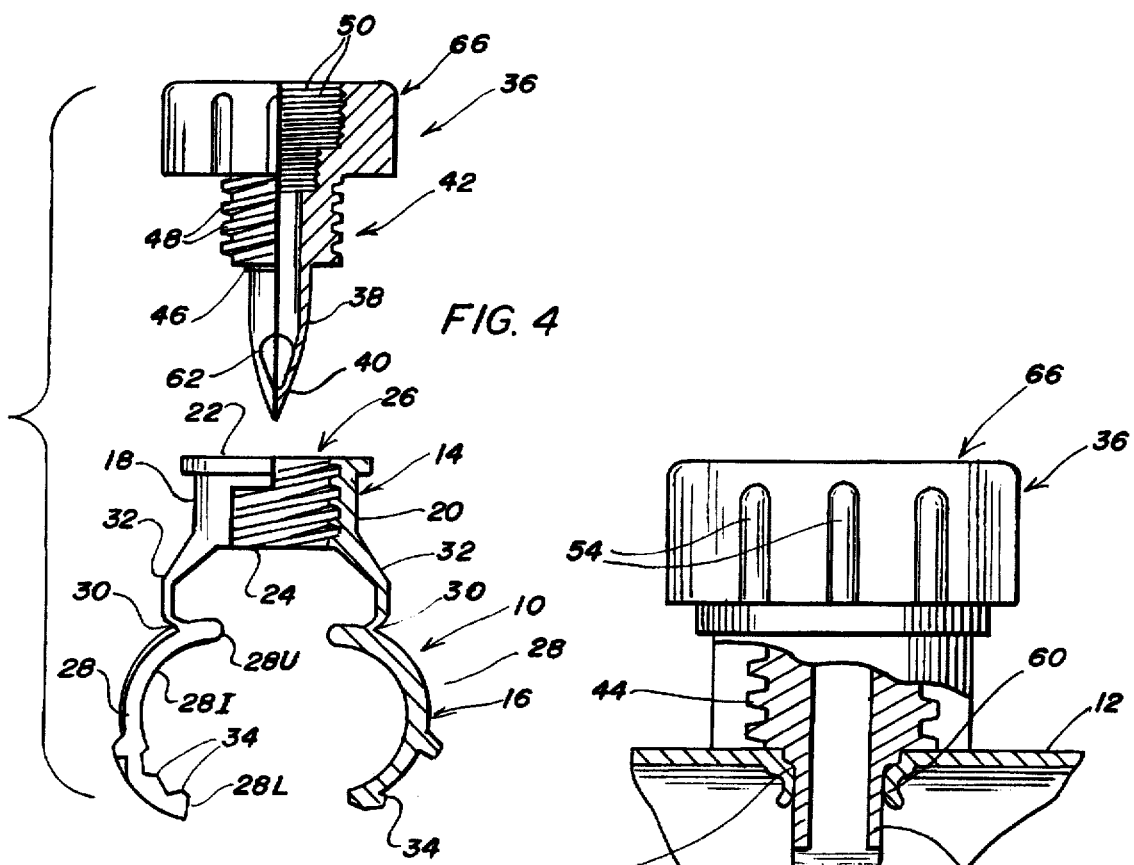
FIG. 4
FIG. 5
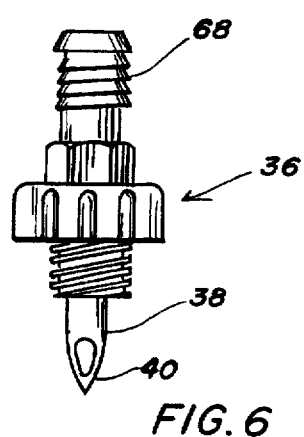
FIG. 6
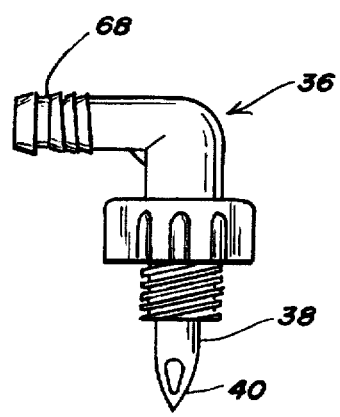
FIG. 7

5,694,972

1

SADDLE TEE FOR IRRIGATION LINES

BACKGROUND OF THE INVENTION

1. Field of the Invention

The present invention relates to a one-piece saddle tee which can be installed on a fluid line such as an irrigation line without tools, adapted for use with a coupling tap.

2. Brief Description of the Prior Art

A saddle tee is used for connecting a branch line to a main irrigation line or an outlet for a sprinkler device or the like. Conventional saddle tees are of two-piece split clamp construction in which the two pieces have laterally extending lugs or ears which are pinned together with nuts and bolts to clamp the saddle tee in place. Attaching a conventional saddle tee to an irrigation pipe or the like requires tools such as screwdrivers, wrenches, pliers and the like and manual dexterity to secure the bolts and nuts, during which time loose parts can become misplaced or lost. After the saddle is installed, a hole is drilled in the main line with a suitable coring tool or drill passing through a fitting on the saddle. The problems of installing a conventional saddle tee have been addressed by several patentees, U.S. Pat. Nos. 4,789,189, 5,095,564 and 5,105,844 being representative of this continuing interest. For example, U.S. Pat. No. 4,789,189 to Robertson describes a saddle tee wherein the bolts are hinged in the ears of the split clamp, facilitating quicker installation and eliminating the possibility that the bolts will become lost, the nuts, however, are still separate and a hole must be drilled in the irrigation pipe as a separate operation.

U.S. Pat No. 5,095,564 to Kruger describes a one-piece saddle tee which includes a semi-cylindrical body attached to a pair of bands. Each of the bands has a pair of serrated arcuate members which interdigitate with similar arcuate members on the other end of the band. To mount the saddle, the bands are pried open wide enough to slip the saddle on the line. The bands are then closed with a pair of pliers, a surface being provided on the bands to facilitate closure with the pliers and a hole is drilled through the fitting in the saddle. While there are no loose parts, the installation of Kruger's saddle tee requires a number of tools, including pliers and a hole cutter.

U.S. Pat. No. 5,105,844 to King describes a two-piece saddle tee formed from identical self-mating members, snapped together on centerline of a fitting. The saddle tee is not adjustable for different sized pipe or tubing, different moldings of the self-mating members being provided for each pipe size. A coupling cutter is threaded into the fitting for use in cutting a hole and is left in place as a tap. A second fitting is provided in the coupling cutter for attachment of a branch line. As shown in FIG. 4, while not requiring tools, installation of the two-piece saddle tee is tricky, a rubber band being provided to hold the two halves of the saddle tee and the coupling cutter together while the lower end of the self-mating members are slipped over the main line. After the saddle is installed, the coupling cutter cuts a coupon from the sidewall of the main line which may remain wedged in the tip of cutter or which may be carried downstream and plug some other component in the irrigation line.

Each of the saddle tees described in U.S. Pat. Nos. 4,789,189, 5,095,564 and 5,105,844 has features which are desirable, along with some faults.

SUMMARY OF THE INVENTION

In view of the above, it is an object of the present invention to provide an improved one-piece saddle tee that can be easily attached without tools to a fluid line. It is another object to provide a saddle tee that can be used with a coupling cutter to punch a hole through the line and left in place as a tap, avoiding outlet clogging and obstruction. Other objects and features of the invention will be in part apparent and in part pointed out hereinafter.

In accordance with the invention, a saddle tee for use on a fluid line such as an irrigation line has a base with first and second ends, top and bottom faces and a passageway communicating between the top and bottom faces for accessing the line. The passageway is adapted for attachment of a coupling tap having a stem tapered at a first end and attached to a fitting at a second end.

In addition to the base, saddle tee has a clamp. The clamp includes a pair of opposing clamp segments having upper, lower and intermediate portions with at least one of the segments being hinged along its intermediate portion to one end of the base. The other of the segments is attached to the other end of the base. Each of the segments has a locking part at its lower end portion cooperating with a locking part of the other of said segments, the locking parts being interengaging serrations or hooks for releasably interconnecting the clamp segments when the clamp is pressed onto the line.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which:

FIG. 1 is an exploded perspective view of a saddle tee adapted for use with a coupling tap in accordance with the present invention, useful in installing a riser or the like in an underground irrigation system;

FIG. 2 is an exploded perspective view of a second saddle tee for use in accordance with a second coupling tap in accordance with the present invention;

FIG. 3 is a perspective view of a third saddle tee in accordance with the present invention;

FIG. 4 is a side elevation view, partly in section, of the first saddle tee and coupling tap shown in FIG. 1;

FIG. 5 is a side elevation view, partly in section and on an enlarged scale, showing the coupling tap shown in FIG. 1 penetrating a line;

FIG. 6 is a side elevation view of a third coupling tap in accordance with the present invention;

FIG. 7 is a side elevation view of a fourth coupling tap in accordance with the present invention;

DETAILED DESCRIPTION OF THE INVENTION

Figure 8:
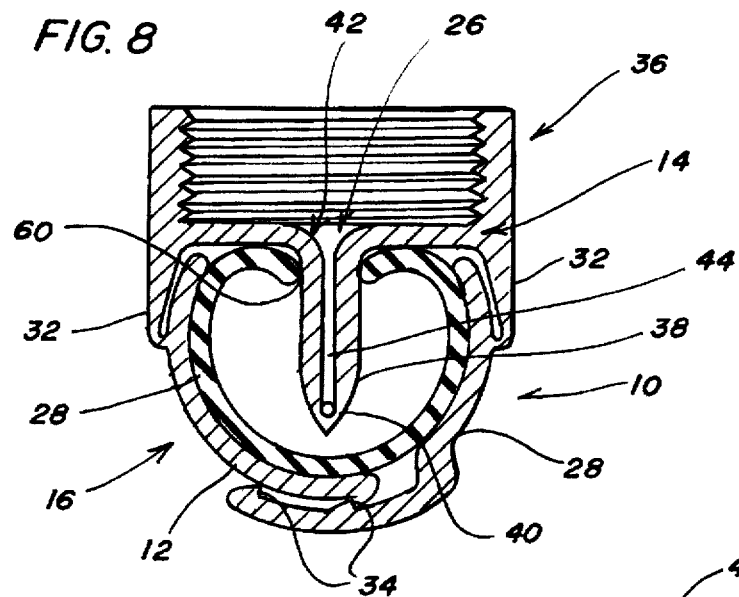
FIG. 8 is a side elevation in section of a fourth saddle tee with an integral coupling tap in accordance with the present invention.

Referring to the drawings more particularly by reference character, reference numeral 10 refers to a saddle tee in accordance with the present invention for attachment to a main line 12 in an irrigation system. In major part saddle tee 10 has a base 14 and a clamp 16. Base 14 bridges line 12 and has first and second ends 18, 20, respectively and top and bottom faces 22, 24 respectively. A passageway 26 is provided in base 14 communicating between the top and bottom faces for use as will be described later.

Clamp 18 has a pair of opposing, arcuate clamp segments 28 having upper, lower and intermediate portions 28U, 28L, and 28I, respectively. Each, or as shown in FIG. 3 at least one, of clamp segments is hinged at 30 along its intermediate portion 28I, opposite the clamp segment which it opposes, to an arm 32 which depends from base 14. As shown in the drawings, hinge 30 is closer to upper portion 28U than lower portion 28L, facilitating entry of line 12 through the gap between the open segments. As saddle tee 10 is pressed on line 12, the pipe or tubing makes contact with upper portions 28U, causing lower portions 28L to pivot about 30, closing the clamp. Each of segments 28 has a locking part 34 at the free end of its lower portion 28L, cooperating with the locking part at the free end of the lower end portion 28L of the other clamp segment. Both locking parts 34 are of a substantially hook-like configuration, one curved inwardly and the other curved outwardly for interengagement. Locking parts 34 provides locking means for interconnecting the clamp segments without tools when the clamp is pressed onto line 10 and, in preferred form as shown, have several locking positions for use with different diameter pipe or tubing, over a selected range.

A coupling tap 36 passes through passageway 26 and is attached to base 14 with suitable attachment means more particularly described below. Coupling tap 36 includes a stem 38 which is conically tapered at a first end 40 and attached to a fitting 42 at a second end. A channel 44 in the stem flowably interconnects the tapered end of stem 38 with fitting 42 providing a connection between the main line and a branch line quickly and easily, with a resultant substantial savings in labor and materials. In the form illustrated in FIGS. 1 and 4, fitting 42 is a cylinder, larger in diameter than the stem, forming an abutment shoulder 46. Fitting 42 has male threads 48 on the outside for attachment to base 14 through female threads which are formed in passageway 26. Fitting 42 is also provided with female threads 50 on the inside for coupling a branch line, riser or the like, including virtually any device which is adapted to be mounted on an irrigation line and have irrigation water flow therethrough. Different diameter female threads 50 may be provided as an upper and lower set for attaching fittings of different sizes. Fitting 42 is preferably provided with a handle having two oppositely facing wing grips 52 and a ribbed surface 54 located on its periphery to aid a user in twisting it into saddle tee 10. In the form shown in FIG. 2, fitting 42 is a cylinder with female threads 50 on the inside, as before, but with a pair of radial lugs 56. Coupling tap 36 is installed on saddle tee 10 with hand pressure, lugs 56 being aligned to pass through a slot 57 in base 14. After the punch has been made, coupling tap 36 is turned a quarter of a turn, locking lugs 56 in undercut slots 58. Throughout the drawings, fitting 42 is illustrated in perpendicular relation to line 12, it should be understood, however, that this angular relation can be varied by varying the configuration of the saddle tee.

Depending on whether line 12 is a flexible tube formed of polyethylene or a stiff pipe formed of polyvinyl chloride, coupling tap 36 may also serve as a coupling cutter/punch. When the line is made of polyethylene, polybutylene or the like, the tapered end of stem 38 punches a hole 60 in line 12 as shown in FIG. 5. For this, stem 38 is preferably formed of a rigid, stiffly-pliant material such as nylon, with the best material for this purpose known to the inventor being acrylonitrile butadiene styrene copolymer (ABS). Stem 38 preferably tapers towards a point with one or more orifices 62 in a sidewall of stem 38, preferably provided as cross holes in the direction of the water flow through line 12 to offer minimal restriction in the line while removing fluid therefore. Orifices 62 are located above the point and flowably connected with channel 44. As coupling tap 36 punches through line 12, clamp 16 supports line 12 so that it does not flatten or otherwise distort while the sidewall of line 12 around hole 60 is stretched and punched, as shown in FIG. 5, forming a seal which seals tighter with water pressure in the line. It will be readily appreciated that no tapping core or coupon is formed to wedge in the tip or to be carried downstream where it may plug some other component.

As coupling tap 36 punches hole 60 in line 12, it must be moved under axially-applied force laterally towards line 12 through passageway 26, first to a seating of tapered point of stem 38 against the exterior surface of line 12 followed by intrusion of the point and tapered end into the line and coaction of the tapered stem with the material of the line wall. Good mechanical advantage is obtained for this purpose when fitting 42 is threaded in passageway 26 as shown in FIGS. 1 and 4. Coupling tap 36 is designed so that when stem 38 penetrates line 12 and a seal is formed by the sidewall of the line around the tapered end of the stem, abutment shoulder 46 of fitting 42 is crushed against the sidewall of line 12 as shown in FIG. 5, forming a secondary seal. Inadvertent loosening of fitting 42 in passageway 26, breaking the seals, can be prevented by providing a stop latch 64, illustrated as a pair of flexible ramp latch stops, on base 14 to prevent loosening of coupling tap 36 after a user screws it into saddle tee 10. In the form illustrated, as the user rotates a handle 66 towards the last turn, wing tips slide over the ramp latch stops. Turning of handle 66 in the opposite direction, however, causes wing grips 52 to engage the end of the ramp latch stops preventing further turning of the handle. Because coupling tap 36 cannot easily move backwardly in passageway 26, the coupling tap is securely locked in saddle tee 10. The same result can be obtained in FIG. 2 by pushing coupling tap 36 through slot 57 until stem 38 penetrates line 12 and abutment shoulder 46 is crushed against the sidewall of the line, whereupon handle 66 is given a quarter of a turn locking lugs 56 in undercut slots 58, preventing the loosening of coupling tap 36 in hole 60. In addition to flowably connecting a second fitting 68 with line 12, stem 38 prevents the relative movement of saddle tee 10 and line 12 either in a longitudinal or in a rotative direction.

Fitting 42 and passageway 26 may be integrally formed with stem 38 together with base 14 as shown in FIG. 8, in which case threads 48 and handle 66 are eliminated and hole 60 is punched as saddle tee 10 is installed on line 12. In this embodiment, when saddle tee 10 is pressed downwardly on line 12 with clamp segments 28 open, the tapered end of stem 38 punches through a sidewall of line 12 as the line pushes against upper portion 28U of clamp segments causing them to pivot around hinges 30 and lower portion 8L to lock. Loosening of fitting 42 in hole 60 is prevented by clamp 16, with the sidewall of the line forming a seal around stem 38 as shown.

When line 12 is a tube formed of rigid material such as polyvinyl chloride, saddle tee 10 may be installed and a hole 60 may be drilled in line 12 through passageway 26 with a suitable coring tool or drill before installing coupling tap 36 which, in this case, should be slightly larger than the hole.

Coupling tap is preferably formed of a less rigid, more compliant material. When coupling tap 36 is formed of SANOPRENE (sold by the Monsanto Company) or the like, the material has enough resilience to permit insertion of the stem through the relatively smaller and inexpansible hole and sufficient memory to sustain a consequent frictional grip on the surrounding wall material, forming a seal. As auxiliary seal, 0-ring, grommet, etc., may be provided in hole 60 if needed. When coupling tap it will be appreciated hole 60, it will be appreciated that stem 38 need not come to a point and may be truncated. Coupling tap 36 may be held against inadvertent movement in passageway 26 with a stop latch or lugs as shown in FIG. 1 or FIG. 2 or with some other structure to the same end.

Fitting 42 may be modified, representative examples of which are shown in FIGS. F and G, replacing female threads 50 with an integrally formed barbed or spiral slip fitting (FIG. 6) for attaching a branch line or with an integrally formed barbed or spiral/"funny pipe elbow" (FIG. 7) or the like. In still other variations, fitting 42 is formed with smooth internal sidewalls, eliminating female threads 50 so that a second fitting or pipe can be solvent welded or otherwise attached to fitting 42 by a suitable adhesive or bonding agent.

Figure 9:
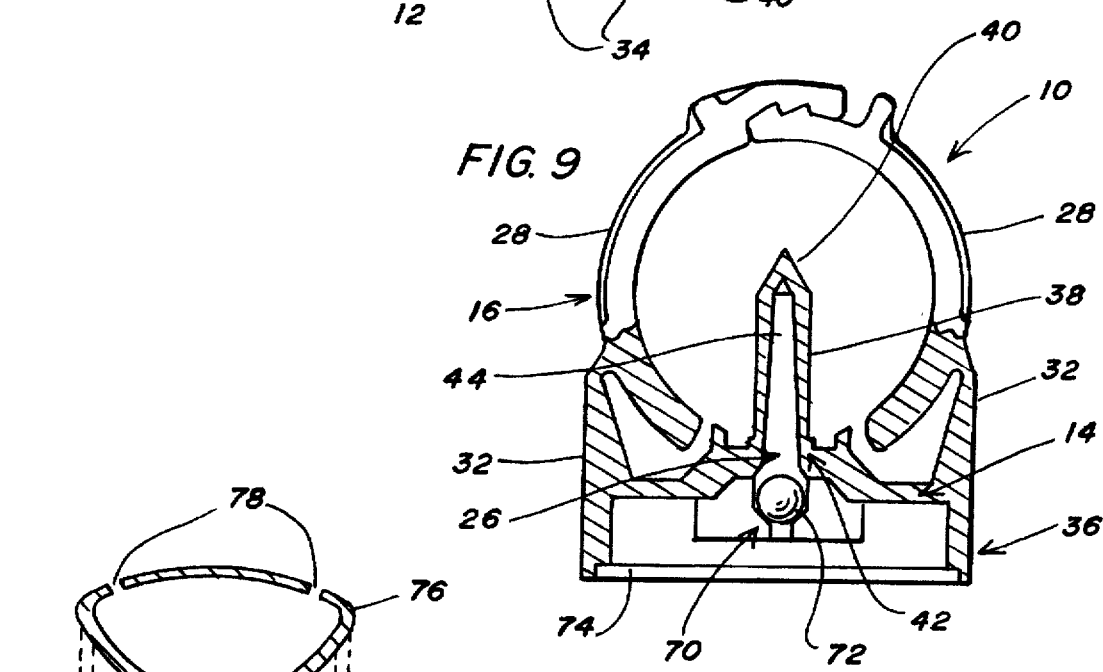
FIG. 9 is a side elevation in section of a fifth saddle tee with an integral coupling tap in accordance with the present invention, said coupling tap having a freeze protection drain valve; and, FIG. 10 is a side elevation in section of a sixth saddle tee with an integral coupling tap in accordance with the present invention, said coupling tap having a fountain sprinkler head.
Figure 10:
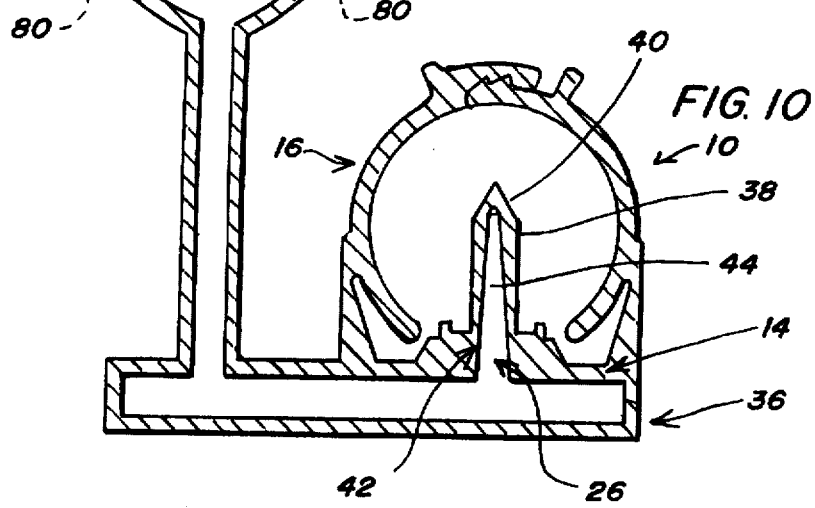

FIGS. 9 and 10 show two additional embodiments of saddle tee 10. In FIG. 9, a freeze protection drain valve 70 is formed in base 14. Fitting 42 and passageway 26 are be integrally formed with stem 38 together with base 14. A check valve 72 is provided in channel 44 at the base of stem 38 and a dispersal pad 74 is provided in fitting 42. Check valve 72 may take a variety of forms, a preferred one being shown including a tapered valve seat having one or more nubs such as radial ribs and a resilient ball. The resiliency of the ball is selected so that the ball is sealed against the valve seat under the force of the water pressure in line 12 and such that it is unseated, permitting water to flow between ball and rib, or the ends of the ribs, into dispersal pad 74 when the water pressure is reduced. The embodiment shown in FIG. 9 can be installed on an underground irrigation line that can be punched with stem 38. In FIG. 10, a sprinkler 76 can be installed on above or below ground irrigation tubing or hose. In this embodiment, as in FIG. 10, fitting 42 and passageway 26 are integrally formed with stem 38 together with base. Fitting 42 is connected to a fountain or sprinkler having a plurality of spray holes 78. In other embodiments the spray holes may be omitted and the fountain outfitted with a plurality of nipples for drip irrigation, tubing and replaceable filter.

In view of the above, it will be seen that the present invention provides a saddle tee which significantly simplifies and reduces the cost of the physical components and the cost of installation and that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A saddle tee for use on an fluid line comprising a base with first and second ends, top and bottom faces, a passageway communicating between the top and bottom faces for accessing the line, and a clamp, said passageway adapted for receipt of a coupling tap comprising a stem tapered at a first end and attached to a fitting at a second end, said clamp including a pair of opposing clamp segments having upper, lower and intermediate portions, at least one of said segments hinged along its intermediate portion to one end of the base and the other of said segments attached to the other end of the base, each of said segments having a locking part at its lower end portion cooperating with a locking part of the other of said segments, said locking parts being interengaging serrations for releasably interconnecting said clamp segments when the clamp is pressed onto the line.

2. The saddle tee of claim 1 wherein the locking parts have at least two locking positions for use on different diameter lines.

3. The saddle tee of claim 1 wherein the passageway is threaded for cooperative engagement with threads on the fitting for moving the stem laterally towards a line held in the saddle tee and for punching a hole in the line.

4. The saddle tee of claim 1 wherein the coupling tap is moved laterally towards a line held in the saddle tee under hand pressure for punching a hole in the line, said coupling tap having at least one radial lug on the stem and said base having a slot through which the lug passes and an undercut slot under which the lug latches when the fitting is turned a portion of a turn after the hole has been punched.

5. The saddle tee of claim 1 wherein the coupling tap is integrally formed with the base.

6. The saddle tee of claim 1 wherein a drain valve is provided in the channel and a dispersal pad is provided in the fitting.

7. The saddle tee of claim 1 wherein a sprinkler head is flowably connected to the fitting.

8. A saddle tee with a coupling tap for use in tapping a fluid line, said saddle tee comprising a base with first and second ends, top and bottom faces, a passageway with female threads communicating between the top and bottom faces for accessing the line, and a clamp, said clamp comprising a pair of opposing clamp segments having upper, lower and intermediate portions, at least one of said segments hinged along its intermediate portion to one end of the base and the other of said segments attached to the other end of the base, each of said segments having a locking part at its lower end portion cooperating with a locking part on the other of said segments, said locking parts being interengaging serrations for releasably interconnecting said clamp segments when the clamp is pressed onto the line, said coupling tap comprising a stem tapered at a first end and attached to a fitting at a second end, an orifice located along tapered first end, said orifice connected with a channel in the stem thereby flowably connecting the orifice with the fitting, said fitting being larger in diameter than the stem and having female threads for threaded engagement with male threads in the passageway, said fitting having a handle, whereby the coupling tap can be used to punch a hole in a fluid line held in the saddle tee by advancing the coupling tap toward the line by turning the handle, as the stem punches a hole in the line, the line forms a seal about the stem that increases with water pressure and the abutment shoulder forms a secondary seal as the shoulder is crushed into the line.

9. The saddle tee with a coupling tap of claim 8 wherein the fitting is a cylinder with female threads on the inside for attaching a second fitting.

10. The saddle tee with a coupling tap of claim 8 wherein the fitting is a cylinder and a second fitting is integrally attached to the inside of the cylinder.

11. The saddle tee with a coupling tap of claim 8 wherein the orifice in the stem is a cross hole in the direction of water flow through the line thereby to offer minimal restriction in the line while removing fluid therefrom.

12. The saddle tee with a coupling tap of claim 11 wherein a stop latch is provided on the fitting permitting rotation of the handle on a last turn in one direction while resisting turning in the opposite direction.

13. The saddle tee with a coupling tap of claim 12 wherein the hole is drilled in the line with a separate tool and the stem is slightly larger than the hole and formed of a resilient member with a memory to sustain a frictional grip on the hole after the stem is pushed through the hole.

14. A saddle tee for use on an fluid line comprising a base with first and second ends, top and bottom faces, a passageway communicating between the top and bottom faces for accessing the line, and a clamp, said passageway adapted for attachment of a coupling tap comprising a stem tapered at a first end and attached to a fitting at a second end, said coupling tap integrally formed with the base of the saddle tee, said stem depending from the bottom face of the saddle tee and said fitting formed in the upper face of the saddle tee, an orifice located above the tapered first end of the stem, said orifice connected with a channel in the stem thereby flowably connecting the orifice with the fitting, said clamp including a pair of opposing clamp segments having upper, lower and intermediate portions, at least one of said segments hinged along its intermediate portion to one end of the base and the other of said segments attached to the other end of the base, each of said segments having a locking part at its lower end portion cooperating with a locking part of the other of said segments, said locking parts being interengaging serrations for releasably interconnecting said clamp segments when the clamp is pressed onto the line.

* * * * *